United States Patent
Putnam et al.

(10) Patent No.: US 10,035,642 B2
(45) Date of Patent: Jul. 31, 2018

(54) RECLOSABLE PACKAGE WITH ANTI STAKE LATCHES

(71) Applicants: Kevin Putnam, Pardeeville, WI (US); Gregg S. Lewis, Middleton, WI (US)

(72) Inventors: Kevin Putnam, Pardeeville, WI (US); Gregg S. Lewis, Middleton, WI (US)

(73) Assignee: Portage Plastics Corporation, Portage, WI (US)

( * ) Notice: Subject to any disclaimer, the term of this patent is extended or adjusted under 35 U.S.C. 154(b) by 126 days.

(21) Appl. No.: 14/769,355

(22) PCT Filed: Mar. 15, 2014

(86) PCT No.: PCT/US2014/030092
§ 371 (c)(1),
(2) Date: Aug. 20, 2015

(87) PCT Pub. No.: WO2014/145351
PCT Pub. Date: Sep. 18, 2014

(65) Prior Publication Data
US 2016/0001949 A1    Jan. 7, 2016

Related U.S. Application Data

(60) Provisional application No. 61/799,036, filed on Mar. 15, 2013.

(51) Int. Cl.
*B65D 85/00* (2006.01)
*B65D 75/22* (2006.01)
(Continued)

(52) U.S. Cl.
CPC ............. *B65D 85/54* (2013.01); *B60S 1/38* (2013.01); *B65D 75/22* (2013.01); *B65D 77/26* (2013.01);
(Continued)

(58) Field of Classification Search
CPC .. B60S 1/38; B60S 1/3848; B60S 2001/3825; B60S 2001/3898; B65D 43/16;
(Continued)

(56) References Cited

U.S. PATENT DOCUMENTS 5,675,861 A    10/1997  Ayers
5,772,031 A     6/1998  Landis
(Continued)

FOREIGN PATENT DOCUMENTS

WO    2014078274    5/2014

*Primary Examiner* — Bryon Gehman
(74) *Attorney, Agent, or Firm* — Boyle Fredrickson S.C.

(57) ABSTRACT

A reclosable package for an article may include a base with a planar floor defining an article-retaining cavity and raised sidewalls extending about the perimeter forming part of the article-retaining cavity with a cover with raised sidewalls coupled to the base configured to move between an open position and a closed position. The sidewalls may form a double wall about the perimeter of the base with a channel that remains open when the cover is disposed in the closed position. A plurality of projections extending from at least one sidewall of at least one of the cover and base and a plurality of notches in at least one sidewall of at least one of the cover and base keep the cover closed as the projections insert into the notches with a snap fit engagement.

24 Claims, 8 Drawing Sheets

(51) Int. Cl.
    *B65D 85/68*     (2006.01)
    *B60S 1/38*     (2006.01)
    *B65D 77/26*     (2006.01)
    *B65D 77/30*     (2006.01)

(52) U.S. Cl.
    CPC ............. *B65D 77/30* (2013.01); *B65D 85/68* (2013.01); *B60S 2001/3825* (2013.01); *B65D 2585/6885* (2013.01)

(58) Field of Classification Search
    CPC ...... B65D 43/162; B65D 75/22; B65D 77/26; B65D 77/30; B65D 85/00; B65D 85/54; B65D 85/68; B65D 2585/6885
    USPC .......................... 206/335, 470, 471; 220/324
    See application file for complete search history.

(56) References Cited

U.S. PATENT DOCUMENTS

| | | |
|---|---|---|
| 5,899,334 A | 5/1999 | Domerchie et al. |
| 6,247,590 B1 | 6/2001 | Baker |
| 6,279,746 B1 | 8/2001 | Hussaini et al. |
| 6,766,906 B2 | 7/2004 | Charng |
| 7,337,900 B2 | 3/2008 | Reiber et al. |
| 7,527,151 B2 | 5/2009 | Park |
| 7,699,169 B2 | 4/2010 | Lewis |
| 7,857,133 B2 | 12/2010 | Skurdalsvold et al. |
| D632,557 S | 2/2011 | Clamagirand et al. |
| 7,926,659 B2 | 4/2011 | Kim |
| 7,938,256 B2 | 5/2011 | Nikitczuk et al. |
| 7,975,849 B2 | 7/2011 | Kim |
| 8,042,690 B2 | 10/2011 | Lewis |
| 8,328,011 B2 * | 12/2012 | Skurdalsvold ......... B65D 43/20 206/1.5 |
| 8,613,357 B2 | 12/2013 | Putnam |
| 8,800,769 B2 | 8/2014 | Ehde |
| 8,910,789 B2 | 12/2014 | Lewis |
| 9,045,256 B2 | 6/2015 | Baker |
| 9,139,347 B2 | 9/2015 | Lewis |
| 9,216,849 B2 * | 12/2015 | Pham ................... B65D 43/162 |
| 9,850,053 B2 * | 12/2017 | Jehannet ................ B65D 85/68 |
| 2005/0252812 A1 | 11/2005 | Lewis |
| 2006/0081493 A1 | 4/2006 | Park |
| 2007/0272577 A1 | 11/2007 | Kim |
| 2008/0230404 A1 | 9/2008 | Park |
| 2010/0206752 A1 | 8/2010 | Nikitczuk et al. |
| 2012/0103852 A1 | 5/2012 | Putnam |

\* cited by examiner

RECLOSABLE PACKAGE WITH ANTI STAKE LATCHES

CROSS-REFERENCE(S)

This application claims a benefit of priority on patent U.S. Application No. 61/799,036, filed Mar. 15, 2013, the entire contents of which are hereby expressly incorporated by reference into the present application.

BACKGROUND

Field of the Invention

The present invention relates generally to packaging material. In particular, the present invention relates to a reclosable wiper blade package for packaging wiper blades.

Background of the Invention

Wiper blades are a mainstay in the automotive industry throughout the United States and the world. Beam-type wiper blades have an elongate beam, typically made of a relatively thin generally rectangular strip of metal, which is substantially continuously curved during manufacture to impart a corresponding substantially continuous curve to an elastomeric, e.g., rubber, wiping element extending outwardly from the beam. Imparting such a substantially continuous curve to the wiping element causes the wiping element to make more uniform contact with a vehicle windshield or windscreen during wiper operation improving the squeegee action of the wiper blade.

Traditional wiper blades typically consist of a steel structure with blade claws extending therefrom and a rubber wiping element attaching to the blade claws. The steel superstructure may pivot about a centrally located adapter with use of springs in order to accommodate for curvature in the windscreen. The adapter is used to attach the wiper blade to a wiper arm of a vehicle.

Numerous challenges have been encountered in designing packaging for all types of wiper blades. One challenge resulted from sealing the wiper blade package for transportation purposes while facilitating easy removal without destruction of the packaging.

Yet another challenge in wiper blade packaging is lowering manufacturing costs by forming the package with as little material as possible while still providing a sturdy structure capable of retaining the beam-type wiper blade in a fixed position while in the package without applying pressure to the wiping element.

While known reclosable wiper blade packages have enjoyed substantial commercial success, improvements nonetheless remain desirable. For example, known methods of sealing the wiper blade packaging consists of fusing the cover and blade-retaining base together along at least a portion of the package. This process is also known as heat staking. Heat staking, while effectively sealing the package, prevents removal of the contents without destruction of the package, thus preventing inspection by a consumer prior to purchase. Additional closing mechanisms fail to provide adequate closing strength and self-open during transportation or handling of the package.

What is therefore needed is an improved reclosable wiper blade package that provides adequate closing force while allowing opening and closing of the package without destruction. What is also needed is a package design capable of providing adequate structural rigidity while still minimizing the thickness of the package.

SUMMARY OF THE INVENTION

A reclosable package may include of a pair of package halves joined by a hinge with one of the package halves being a cover. The other one of the package halves may be an article-retaining base having an article-retaining cavity formed therein. A package closure arrangement may be formed in the cover and base of a plurality of spaced apart package closures that releasably keep the package closed when engaged. The package closures may form a hook snap including a snap hook formed in one of the cover and base and a snap hook receiver formed in the other one of the cover and base. The package closures may be formed of a hook in the one of the cover and base which engages an edge of the other one of the cover and base formed by a cutout when the hook snap is releasably engaged.

The snap hook, or hook, may have a hook arm cantilevered outwardly from the one of the cover and base having an upturned hook lip at the free end thereof while the snap hook receiver may have an edge of the other one of the cover and base disposed between the hook lip and the one of the cover and base when the hook snap is releasably engaged. The snap hook receiver may be formed of a trimmed edge of the other one of the cover and base. The hook arm may also be formed in a generally triangular shape forming a hook lip disposed at a vertex or point, of the generally triangular hook arm.

The hook formed in the one of the cover and base engages an edge of the other one of the cover and base formed by the cutout when the hook snap is releasably engaged.

The cover and the base may each have a sidewall overlapping one another when the cover is closed overlying the base with each one of the plurality of package closures. The hook portion of the closure may be formed in the sidewall of one of the cover and base and engage part of the sidewall of the other one of the cover and base when the cover is closed.

The hinge joining the cover and base may be elongate and extend along one side of the reclosable package and the overlapping sidewalls of the base and cover, forming a flange on each of the cover and base, and extend along an opposite side of the reclosable package. Each hook may then extend generally toward the hinge when engaged with part of the sidewall of the other one of the cover and base when the package is closed. In other words, the hook may engage a trimmed edge of the flange when the cover is closed.

To add strength to the package, the sidewall of the other one of the cover and base may be comprised of a rib having a pair of spaced apart rib sidewalls extending outwardly from a rib endwall. One of the rib sidewalls may include a flange that engages the hook when the cover is closed. Preferably, each one of the hooks is formed in the cover and the rib is formed in the base.

The ribs may include a generally U-shape or V-shape formed in one of the cover and base with of a pair of spaced apart rib sidewalls extending from a rib endwall having a plurality of rib constrictions spaced longitudinally along the rib formed of sections of the rib sidewalls and rib endwall pinched together with plastic deformation. Each one of the rib constrictions may form the generally U-shaped or V-shaped recess in the rib endwall and each one of the rib constrictions may have a thickness less than the width of the rib. Each one of the rib constrictions may form a rib strengthening gusset in the rib constriction. The rib may form at least a portion of a wall of the one of the cover and the base and at least a portion of the article-retaining cavity of the base. A part of the plurality of the package closures, preferably the timed edge or notch, may be disposed between a pair of the rib constrictions, or gussets, to strengthen the closures.

Additionally, one part of the plurality of the package closures formed in part of the rib of the one of the cover and base may include one of a hook and hook receiver and the other part of the plurality of the package closures may be formed in the other one of the cover and base may include the other one of a hook and hook receiver.

These and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the words "connected", "attached", or terms similar thereto are often used. They are not limited to direct connection but include connection through other elements where such connection is recognized as being equivalent by those skilled in the art.

DETAILED DESCRIPTION

The present invention and the various features and advantageous details thereof are explained more fully with reference to the non-limiting embodiments described in detail in the following description.

Figure 1:
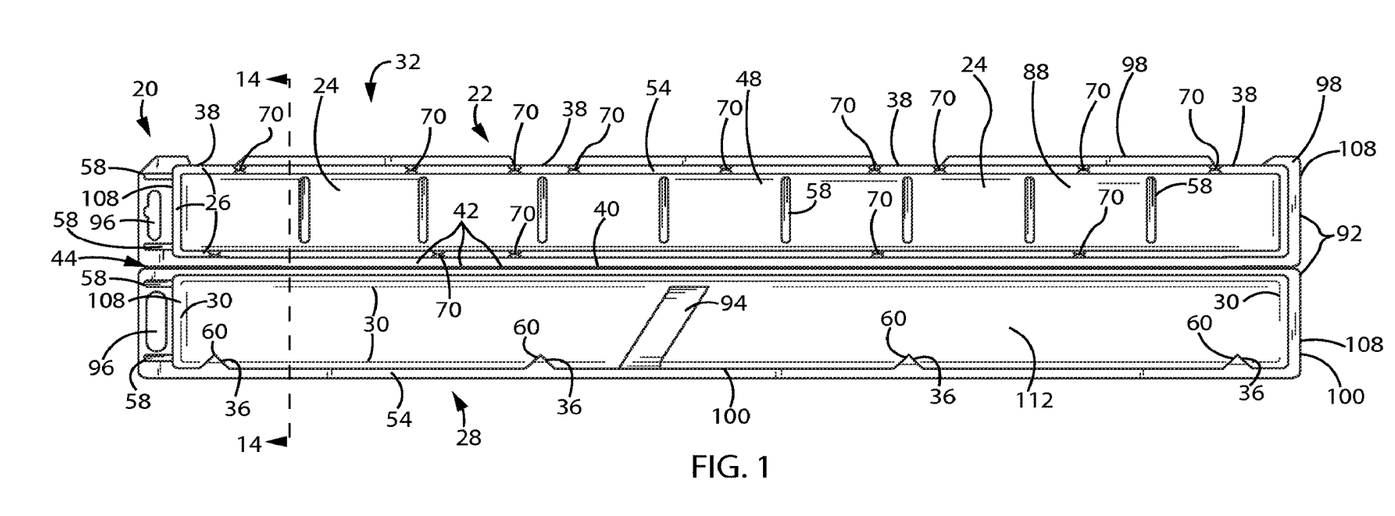
FIG. 1 illustrates a top view of a reclosable package in an open position.
Figure 2:
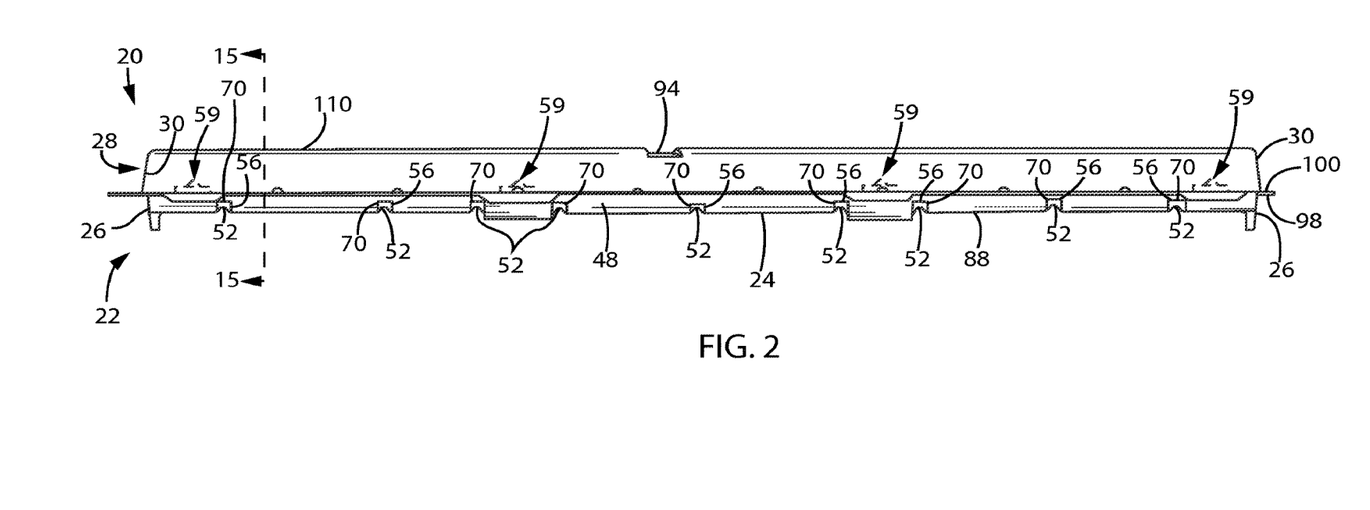
FIG. 2 illustrates a side view of the reclosable package in a closed position according to the FIG. 1.

Referring to FIGS. 1-2, a reclosable package 20, which may be used to enclose a wiper blade, is shown in an open position 32 in FIG. 1 and in a closed position 34 in FIG. 2. The reclosable package 20 includes two package halves 92, herein referred to as a cover 28 and a base 22. The base forms a storage compartment 48 for storing one or more articles. The reclosable package 20 may be formed using any manufacturing methods, but is preferably constructed using a vacuum thermal formed sheet of polyester resin, polyethylene terephthalate, commonly referred to as PET.

Figure 4:
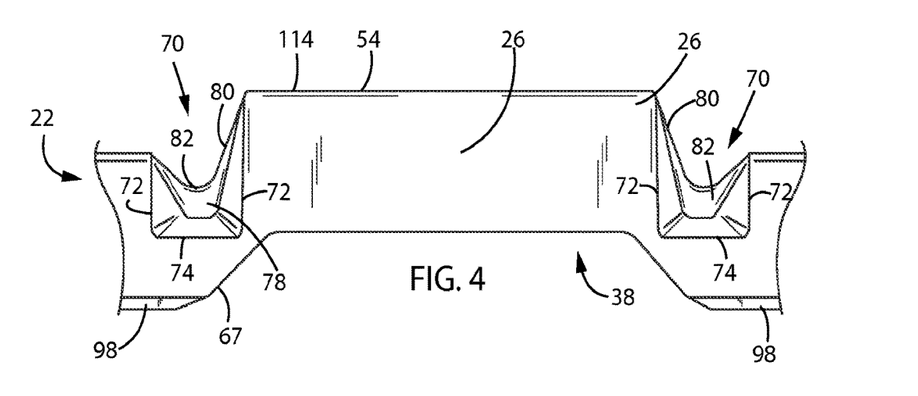
FIG. 4 illustrates a side view of a portion of the base of the reclosable package according to FIG. 1 showing part of a package closure.
Figure 5:
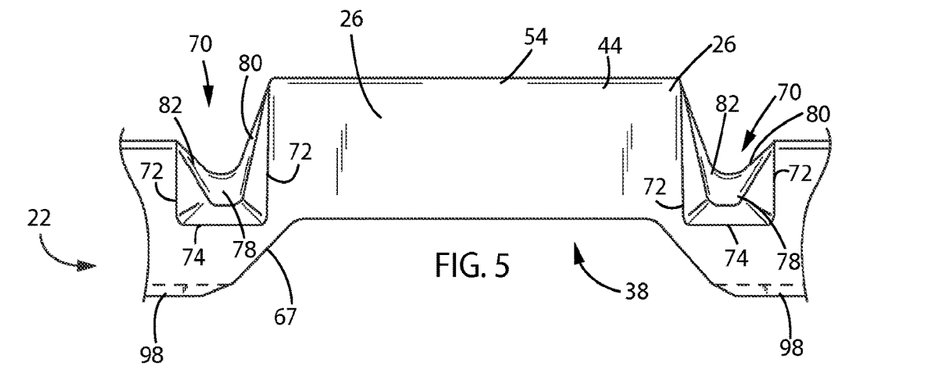
FIG. 5 illustrates the opposite side of the portion of the package closure of FIG. 4.
Figure 15:
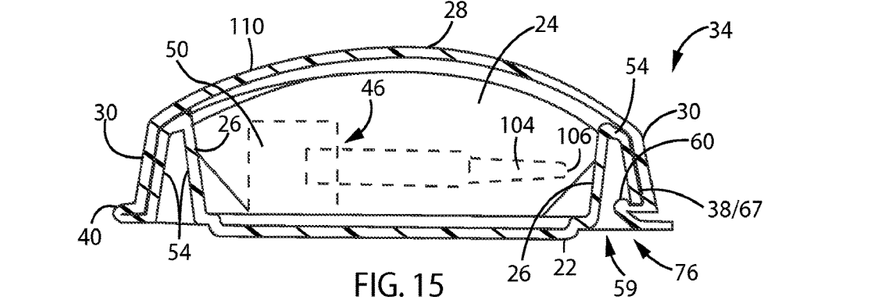
FIG. 15 illustrates a section side view of a reclosable package in a closed position along section line 15:15 in FIG. 2 with an added wiper blade.

The base 22 includes sidewalls 26 extending substantially perpendicular from a generally planar bottom 88 forming an article retaining cavity 24 that is preferably used for retaining a wiper blade 46, shown in FIG. 15. The sidewalls 26 of the base form a double wall 54, best shown in FIG. 4, with an open bottom, but may also include a closed bottom. A generally planar flange 98 extends from the perimeter of the outer portion of the base sidewalls 26. Similarly, the cover 28 forms an enclosure for the base 22 with a top 110 and sidewalls 30 extending from the perimeter of the top. A substantially flat cover flange 100 extends outwardly about the perimeter of the cover sidewalls 30.

The cover 28 is hingedly coupled to the base 22 as each respective flange 100, 98 includes a joined sidewall 30, 26 thus forming a hinge 40. The hinge 40 forms a fold line 44 about which the cover pivots. In order to better facilitate the pivoting motion, a plurality of perforations 42 extends along the hinge 40 allowing pivoting without binding.

Included on one end 108 of both the cover 28 and the base 22 is a hanger hole 96. When the reclosable package 20 is in the closed position 34, shown in FIG. 2, the cover flange 100 is pressed against the base flange 98 such that each hanger hole 96 lines up to one another allowing the reclosable package 20 to be hung on a hook passing through the hanger hole 96.

In order to strengthen the bottom 88 of the article retaining cavity 24, a plurality of indentations 58 may be formed therein adding surface area and a third dimension to the bottom 88. The indentations 58 provide a greater degree of structural integrity and assist in resisting bending forces applied to the bottom 88. Similar indentations 58 may be formed in any portion of the reclosable package 20 to add structural rigidity. For example, indentations 58 are shown in FIG. 1 on each side of each hanger hole 96. The indentations 58 formed in the flanges 100, 98 may be equally and oppositely formed allowing a raised portion of indentations 58 on one flange to nest within the indentations 58 on the opposite flange and assist in keeping the cover 28 in a closed position 34 as seen in FIG. 2.

The cover 28 also includes a graphics card ledge 94 formed therein. The graphics card ledge 100 forms an indentation into the cover 36 towards the bottom 88 of the base 22 when in the closed position 120. Advertising or other promotional information may be affixed to the cover 36 within the reclosable package 20 while the graphics card ledge 94 prevents such media from sliding about the cover 28.

Figure 3:
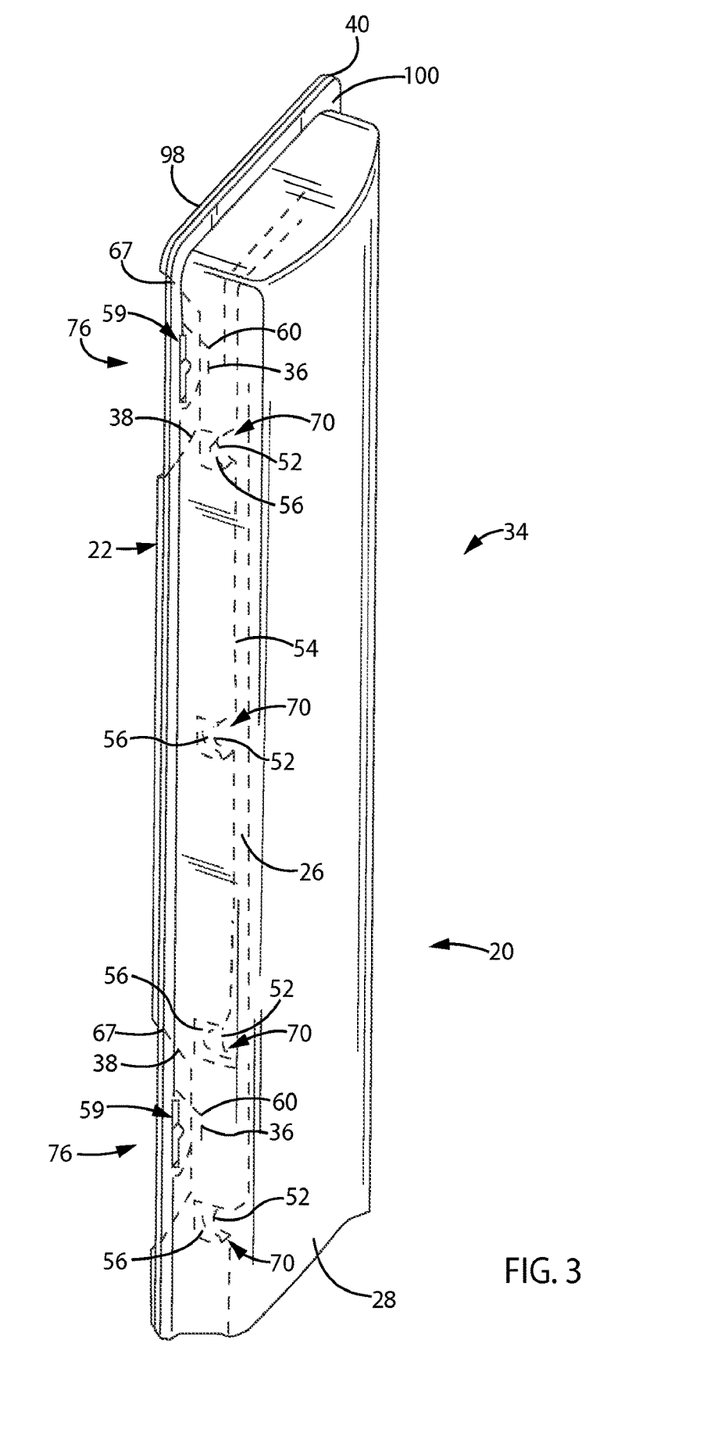
FIG. 3 illustrates a perspective view of the reclosable package in a closed position according to the FIG. 1 with phantom lines showing a portion of the contents within.

Referring now to FIG. 3, the cover 28 of the base 22 is shown in the closed position 34 and is retained in the closed position 34 with the use of package closures 76. While two package closures 76 are shown in FIG. 2, any number of similar closures 76 may be used about the perimeter of the reclosable package 20. The package closures 76 form a hook snap 59 that is a two-part system. One part may be included in the cover 28, along the cover flange 100 and the mating part may be formed in the base 22, along the base flange 98. Either part of the hook snap 59 may be formed in either the base 22 or cover 28.

Preferably, the hook snap 59 is formed with two parts, a notch 38 or trimmed edge 67 in the base sidewall 26, and a projection 36 or snap hook 60 extending from the cover 28. The notch 38 may trim the flange 98 and both walls in the double wall 54 of the base sidewall 26 but preferably is only formed in the outer wall of the double wall 54 and the flange 98, thus retaining the sidewall 26 of the article retaining cavity 24 intact. Both components of the hook snap 59 are shown in phantom view in FIG. 3 as the projections 36, or hooks 60, extend from the interior of the cover 28 towards the notch in the base sidewall 26 when in the closed position 34. Similarly, FIG. 3 shows the ribs 70 in phantom view as the cover 28 conceals them when in the closed position 34.

Also included in the reclosable package 20, to provide additional structural rigidity, is a plurality of ribs 70 formed along the sidewall 26 of the base 22. The ribs 70, best shown in FIGS. 4-9, include a curvature on each side of the double wall 138 and meet at a central point forming a gusset 80 of a substantially straight formation, when viewed from the top as in FIG. 15. The ribs 70 are formed by pinching together each side of the double wall 54 formed in the sidewall 26 of the base 22.

Figure 6:
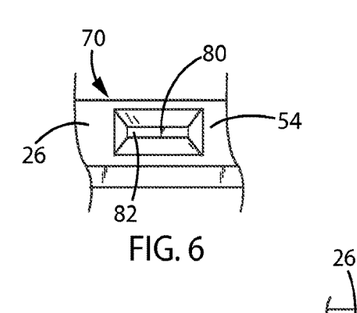
FIG. 6 illustrates a top view of a rib formed in a portion of the sidewall of the base of the reclosable package.
Figure 7:
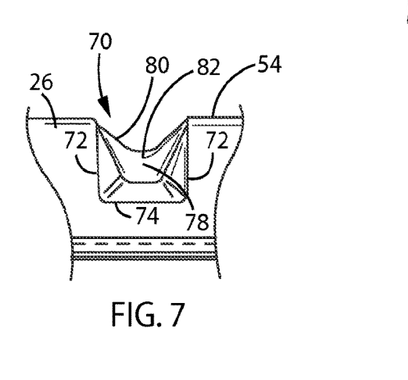
FIG. 7 illustrates a side view of the rib according to FIG. 6.
Figure 8:
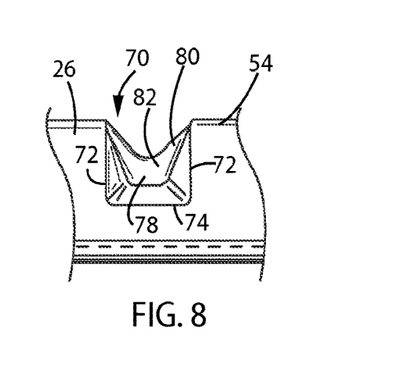
FIG. 8 illustrates a side view opposite the side of FIG. 7 showing the rib according to FIG. 6.
Figure 9:
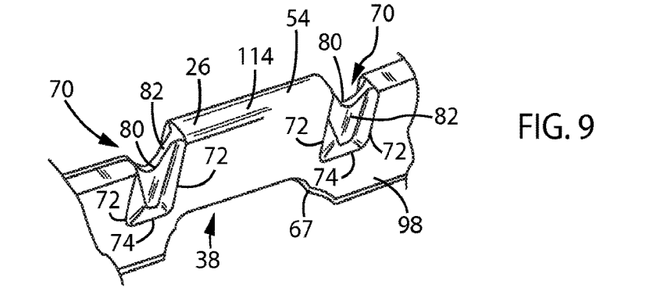
FIG. 9 illustrates a partial perspective view of a portion of a package closure and ribs formed in the sidewall of the base according to the present invention.

The pinching process is performed by plastically deforming the double wall 54 of the base sidewall 26, however the double wall 54 is not fused together in this process. Each wall of the double wall 54 is plastically deformed to create a gusset 80 and place the walls in contact with one another throughout the gusset 80. The ribs 70 include rib sidewalls 72, a rib end wall 74, and a gusset 80 formed between each rib sidewall 72 that produces a constriction 78 in a substantially U-shaped, or V-shaped curvature. The rib constriction 78, or gusset 80, is created during the thermo molding process. As the double wall 54 is pinched to form the rib, the material webs forming webbing 82 of less thickness than each wall of the double wall 54, as shown in FIG. 6. This allows for formation of the structurally strengthening rib 70 and gusset 80 while at the same time minimizing the amount of material needed. The gussets 80 are formed of webbing 82 between the rib sidewalls 72 where each wall of the double wall 54 contacts one another. The ribs 70 provide greater structural rigidity as they oppose a force spreading the double wall 54 apart, due in part to the curvature 84 of the webbing 82, the shape of the ribs 70, and the pinched-together rib constriction 78. The gussets 80 and curvature of the ribs 70 increase structural rigidity as they increase the surface area, providing a third dimension to the otherwise flat, planar area of the base sidewall 26.

Figure 10:
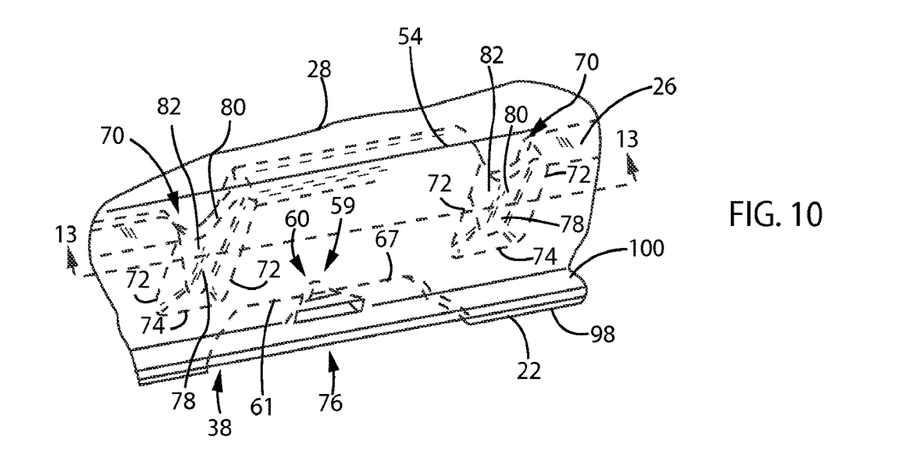
FIG. 10 illustrates a partial perspective view of a fastened package closure and ribs in phantom formed in the sidewall of the base according to the present invention.

Similar to FIG. 3, both components of the hook snap 59 are shown in phantom view in FIG. 10 as the projections 36, or hooks 60, extend from the interior of the cover 28 towards the notch in the base sidewall 26 when in the closed position 34. FIG. 10 also shows the ribs 70, best described above with respect to FIGS. 4-8, in phantom view as the cover 28 conceals them when in the closed position 34. As previously mentioned, the hook 60 may extent from either the base 22 or cover 28 with the receiving notch 38 formed in the other one of the base 22 or cover 28.

Figure 11:
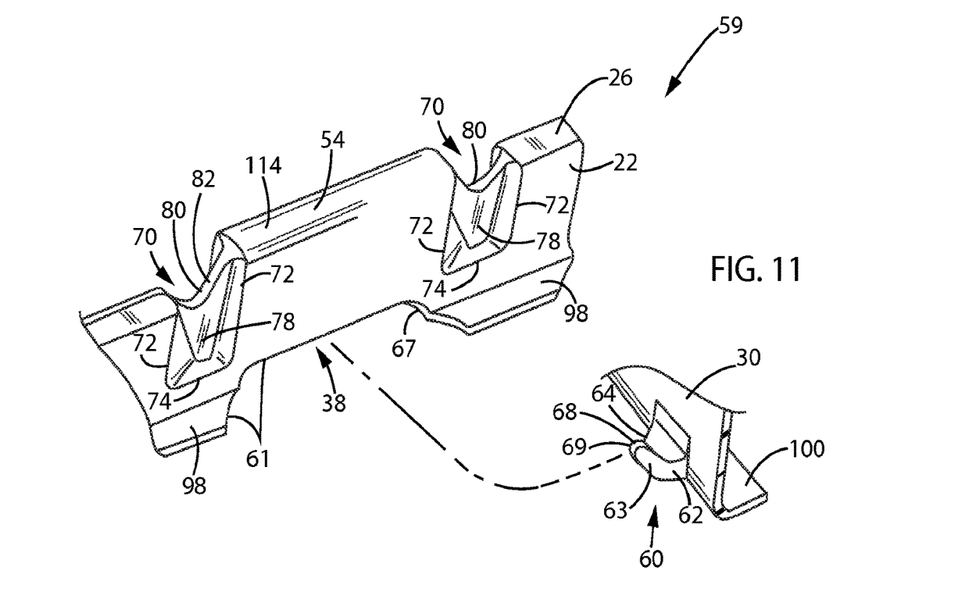
FIG. 11 illustrates a partial perspective view of each portion of a package closure partially exploded and ribs formed in the sidewall of the base according to the present invention.

Referring to FIG. 11, a hook 60 projects from the cover sidewall 26 towards the inner portion 112 of the cover 28, shown best in FIG. 1. A notch 38 is cut out of the outer wall of the double wall 54 in the base 22 that receives the hook 60, thus retaining the cover 28 in the closed position 34. The hook 60 includes a hook arm 63 extending upwardly curving away from the sidewall 30 of the cover 28 forming a gap 64 between the cover sidewall 30. The point 68, or vertex 69 of the curved hook is inserted behind the notch 38 in the trimmed edge 67 of the base flange 98 and double wall 54 such that the point 68 latches onto the trimmed edge 67 to keep the cover 28 in the closed position 34 as shown in FIGS. 12 and 13.

Figure 12:
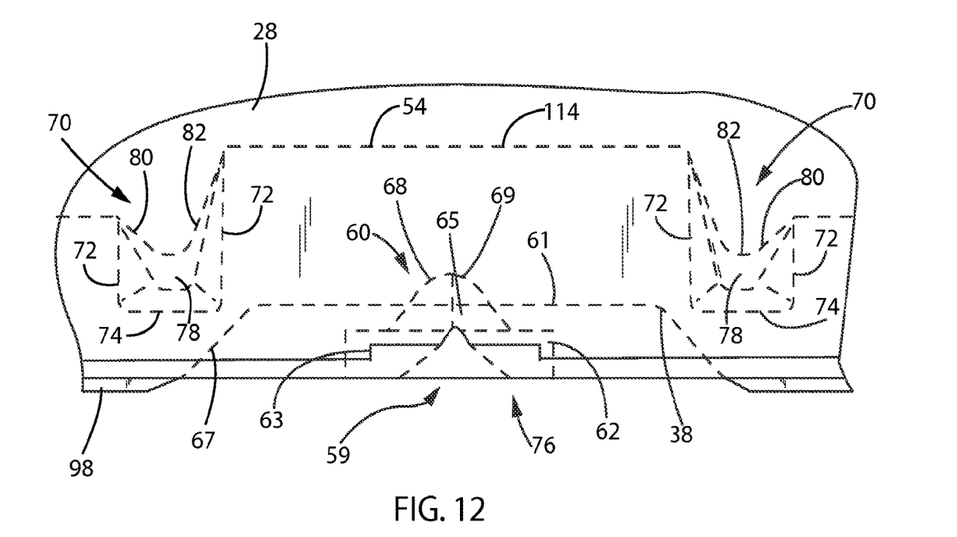
FIG. 12 illustrates a partial side view of a fastened package closure and ribs in phantom formed in the sidewall of the base according to FIG. 10.
Figure 13:
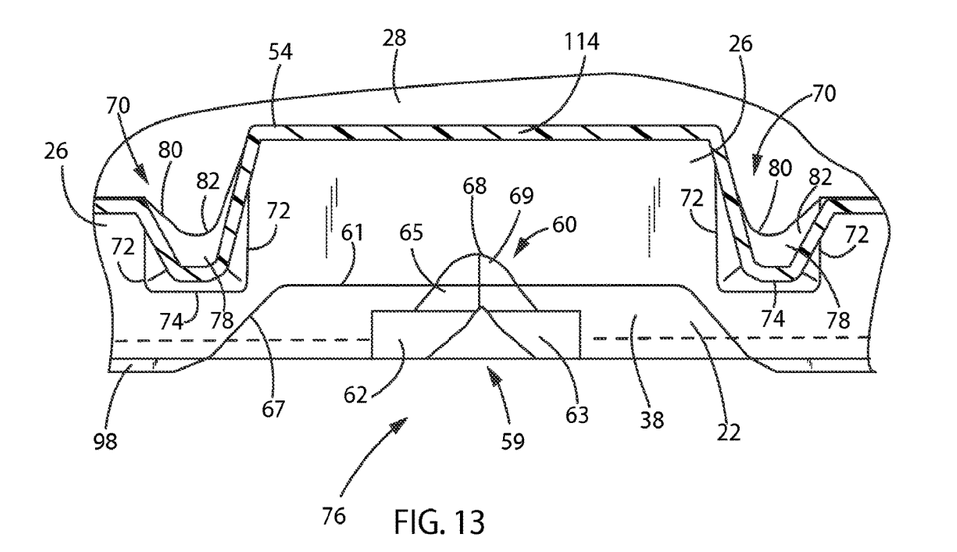
FIG. 13 illustrates a partial section side view of a fastened package closure and ribs formed in the sidewall of the base along section line 13:13 in FIG. 10.

Additionally, with respect to FIGS. 12 and 13, ribs 70 are each located on the sides of the notch 38. The ribs 70 further strengthen the notch 38 such that when the hook 60 latches onto the trimmed edge 67, the base sidewall 26 does not deform. In other words, the ribs 70 adjacent the notches 38 form strengthening buttresses and stiffen the trimmed edge 67 to make the base sidewall 26 strong enough to retain the hook point 68 and keep the cover 28 in the closed position 34. Additionally, the raised section 114 provides added material between the trimmed edge 67 and the top of the sidewall 26, an approximately proportionate amount to the side of the notch 38, to account for the removed material of the notch 38 and strengthen the sidewall 26. Due to the curvature 84 of the webbing 82 in the gusset 80, the raised section 114 is further tied to the rest of the sidewall 26 and further strengthened.

Figure 14:
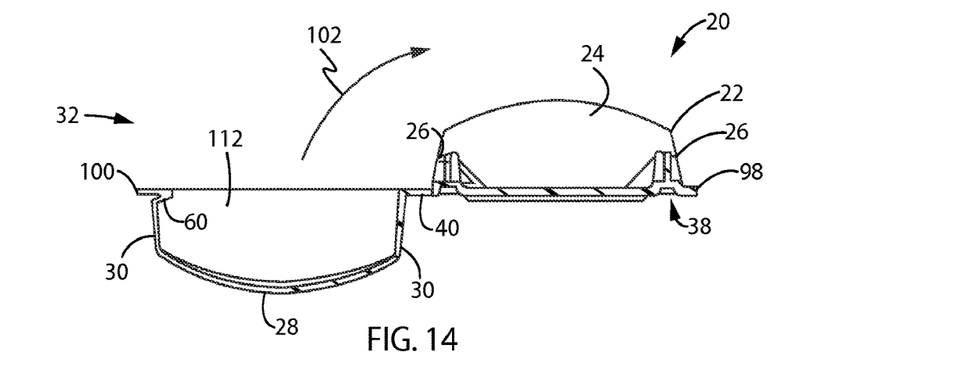
FIG. 14 illustrates a section side view of a reclosable package in an open position along section line 14:14 in FIG. 1.
Figure 16:
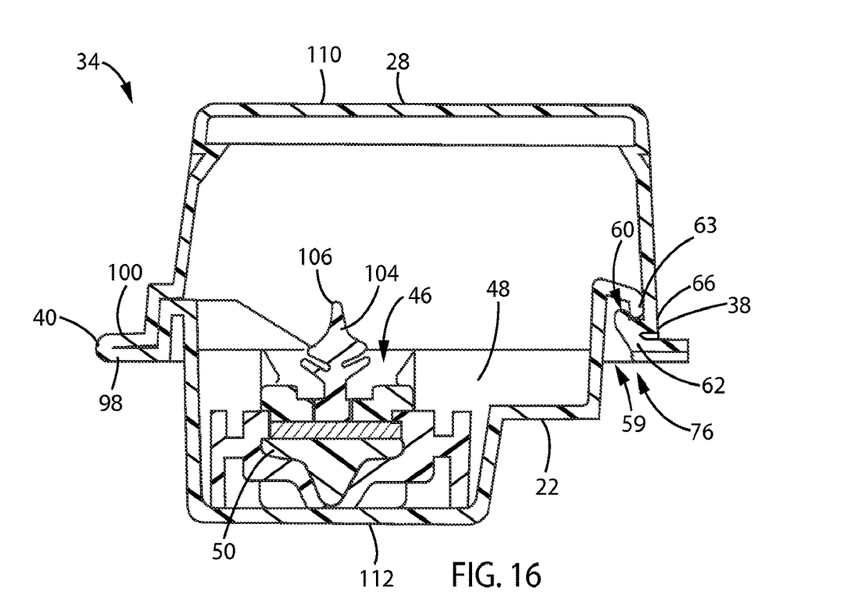
FIG. 16 illustrates a partial sectional side view of a reclosable package in a closed position along a section line, similar to FIG. 15, according to another embodiment of the invention.

Turning now to FIGS. 14-16, a cross sectional view of the reclosable package 20 is shown. In FIG. 14 the cover 28 is shown in the open position 32 but may be placed into the closed position 34, as is shown in FIG. 15, with a pivoting motion 102. The pivoting motion 102 pivots the cover 28 about the hinge 40 that joins the cover flange 100 and base flange 98 together. As mentioned above, in order to retain the cover 28 in the closed position 34, a plurality of hooks 60 project from the cover sidewall 26 towards the inner portion 112 of the cover 28. A notch 38 is cut out of the outer wall of the double wall 54 in the base 22 that receives the hook, thus retaining the cover 28 in the closed position 34.

Also shown in FIG. 15 is a wiper blade 46, which is drawn in phantom as the wiper blade 46 demonstrates one possible article that may be stored in the reclosable package. The package closures 76 may be formed in any package for any device. In the preferred embodiment, a wiper blade 46 is enclosed within the article retaining cavity 24. The cavity 24 is formed of sufficient size such that the wiping edge 106 of the squeegee 104 is not deformed by any pressure against it by contacting a sidewall 26 of the base 26. As a result, the wiping edge 106 remains suspended in the air and any stretching, binding, or deforming pressure to the wiping edge 48 is prevented. This ensures a quality product whenever the wiper blade 46, or other article stored therein, is removed from the reclosable package 20 upon a retail purchase or inspection, regardless of storage time.

FIG. 16 shows an alternative embodiment of the invention wherein the base 22 is formed with an alternative bottom 112. The alternative bottom 112 differs from the bottom 88 shown in FIG. 15 as it accommodates a beam-type wiper blade. The beam-type wiper blade 46 is retained in a substantially straightened position, removing any pre-curvature in the blade arms 50 and therefore keeping the squeegee 104 and the wiping edge 106 suspended in the air, and in contact with the reclosable package 20. This ensures the squeegee remains in optimal condition, as described above.

Also shown in FIGS. 15 and 16 are the package closures 76, or hook snaps 59 in a fastened position and keeping the cover 20 in the closed position 34. The hook 60 portion of the hook snap 59 includes a hook arm 63 extending upwardly and away from the sidewall 30 of the cover 29 with a hook 60 extending vertically therefrom and is inserted behind the notch 38 to keep the cover 28 in the closed position 34.

Figure 17:
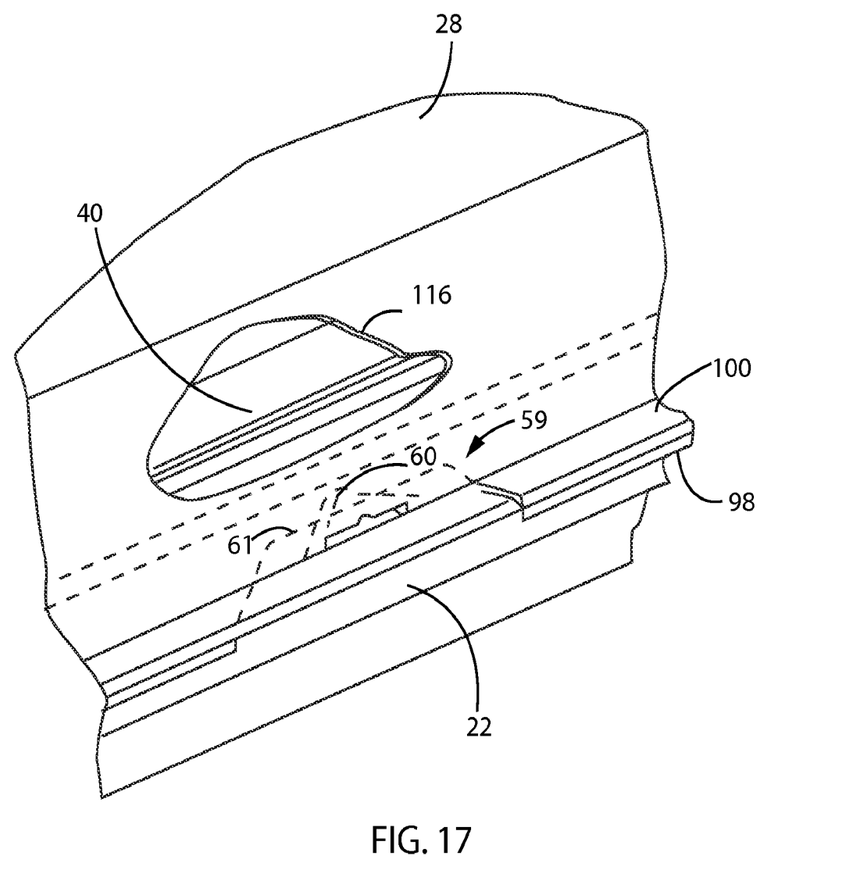
FIG. 17 illustrates a partial perspective view of a fastened package closure in phantom formed in the sidewall of the base according to FIG. 10 with a removed section of the cover showing the article retaining cavity according to the present invention.

Referring to FIG. 17, the hook snap 59 is shown again in phantom view. As previously discussed, the hook snap 59 is formed with two parts, a notch 38 or trimmed edge 67 in the base sidewall 26, and a projection 36 or snap hook 60 extending from the cover 28. The notch 38 functions as a hook receiver 61 to retain the point 68 of the hook 60 and keep the trimmed edge 67 against the base 62 of the hook. Also shown is the compartment 48 of the base 22 shown through a removed section 116 of the cover 28.

Figure 18:
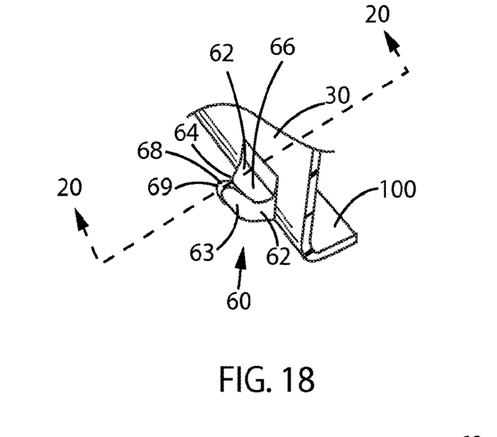
FIG. 18 illustrates a partial perspective view of a hook portion of a package closure according to the present invention.
Figure 19:
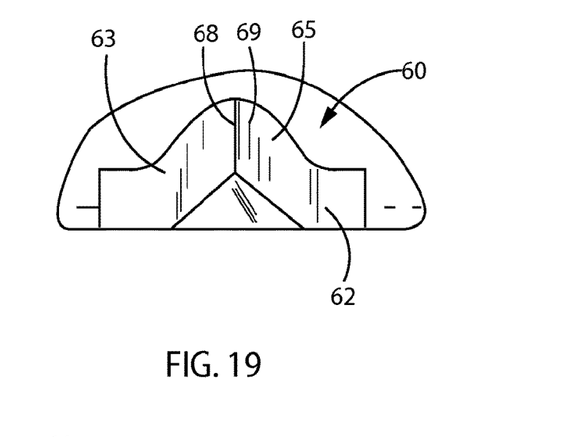
FIG. 19 illustrates a partial front view of the hook portion of a package closure according to FIG. 18.
Figure 20:
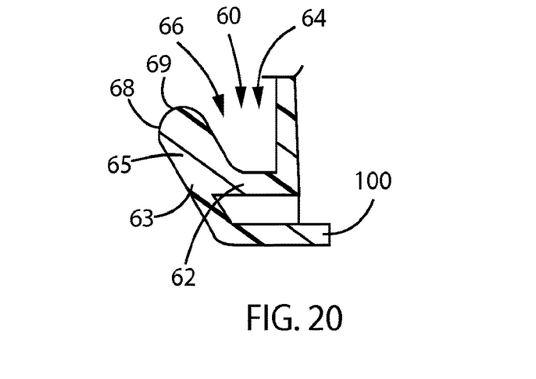
FIG. 20 illustrates a partial cross section view of the hook portion of a package closure according to FIG. 18 along section line 20:20.
Figure 21:
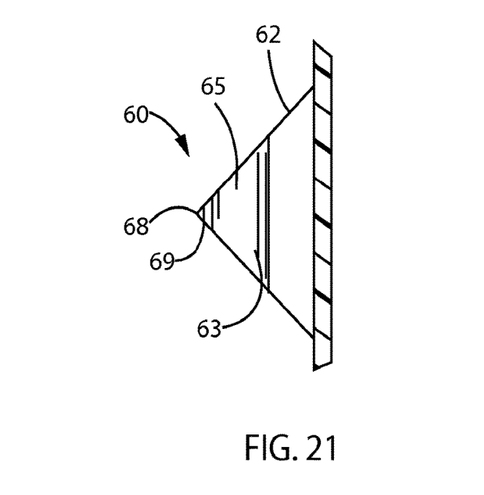
FIG. 21 illustrates a partial lower elevation front view of the hook portion of a package closure according to FIG. 19.
Figure 22:
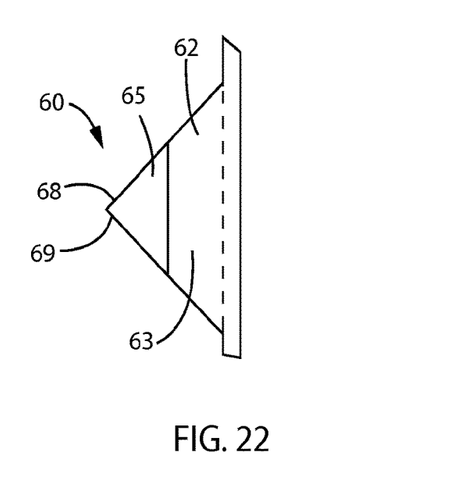
FIG. 22 illustrates a partial lower elevation front view of the hook portion of a package closure according to FIG. 19.

FIGS. 18-22 show the hook 60 in various angles. FIGS. 18 and 20, specifically, show the various components of the hook 60. The hook begins with a base 62 extending approximately perpendicular from the interior portion of the cover sidewall 30. The extended base 62 forms a gap 64 between the sidewall 30 in the hook arm 63. The hook arm 63 is angled vertically away from the base 62 creating a throat 66 in the hook 60. The hook arm 63 finishes at a lip 65 that includes the curvature thus forming a point 68 at the vertex 69 of the curvature 69. The point 68 is best shown in FIGS. 19, 21, and 22. The point 68 forms a pointed top with the curvature extending from the point 68 to the throat 66 of the base 62. The angled hook arm 63 creates the throat 66 and gap 64 which retain the trimmed edge 67 of the base sidewall 26.

As previously mentioned, the flange 98 and both walls in the double wall 54 of the base sidewall 26 may include a trimmed edge 67 that nests in the throat 66 and gap 64 of the hook 60 but preferably is only formed in the outer wall of the double wall 54 and the flange 98, thus retaining the sidewall 26 of the article retaining cavity 24 intact. The hook arm 63 may be formed into a generally triangular shape as shown in FIG. 21 and FIG. 22, although any other shape may also be used. The triangular shape lessens the amount of material needed to create the hook 60 and is therefore the preferred shape. The angle and the length of the hook arm 63 determine the ability for the hook 60 to retain the trimmed edge 60 within the throat 66 and gap 64. As the angle of the hook arm approaches a 90° angle to the base the two the retaining ability is increased, however it becomes more difficult to you elastically deform the trimmed edge 67 insert the points 68 of the hook 60 behind the base sidewall 26, however, any angle and length of the hook arm 63 may be used to effectively retain the sidewall in the throat 66 and gap 64 of the hook 60.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept.

Furthermore, all the disclosed features of each disclosed embodiment can be combined with, or substituted for, the disclosed features of every other disclosed embodiment except where such features are mutually exclusive.

It is intended that the appended claims cover all such additions, modifications and rearrangements. Expedient embodiments of the present invention are differentiated by the appended claims.

What is claimed is:

1. A reclosable package for an article comprising:
 a base with a planar floor defining an article-retaining cavity and raised sidewalls extending about a perimeter of the base forming part of the article-retaining cavity; and
 a cover with raised sidewalls coupled to the base configured to move between an open position and a closed position, wherein the sidewalls form a double wall about the perimeter of the base with a channel that remains open when the cover is disposed in the closed position;
 a hook receiver formed in one of the sidewalls of the cover and base;
 a hook formed of a portion of the other one of the sidewalls of the cover and base, the hook having (i) a base extending outwardly from the other one of the sidewalls of the cover and base, and (ii) an upturned point extending outwardly from the base that retains the cover in the closed position with a snap engagement of the hook receiver; and
 a plurality of indented gussets formed of a section of the double wall, wherein at least a portion of one of the double wall is plastically deformed to contact the other wall of the double wall to form a pinched section.

2. The reclosable package for an article of claim 1, further comprising:
 a plurality of projections extending from at least one sidewall of at least one of the cover and base; and a plurality of notches in at least one sidewall of at least one of the cover and base such that the projections insert into the notches to retain the cover in the closed position with a snap fit engagement.

3. The reclosable package for an article of claim 2, wherein the hook receiver is formed of a notch, and wherein the hook is formed of a gap, a throat, and a point configured to hook onto the hook receiver locating a portion of the sidewall proximate the notch of the hook receiver within the throat of the hook thus retaining the cover against the base when the cover is disposed in the closed position.

4. The reclosable package for an article of claim 1, further comprising a hinge with a plurality of perforations that define a fold line of the hinge about which the cover pivots when moved to the closed position allowing the cover to rest against at least a portion of the sidewalls of the base.

5. The reclosable package for an article of claim 1, wherein the article-retaining cavity formed in the base is configured for receiving a wiper blade therein and includes an elongate longitudinally extending compartment in which an elongate arm of a wiper blade seats.

6. The reclosable package for a wiper blade of claim 1, wherein the gussets are formed in opposing lengths of the double wall such that the gussets on a first length of the double wall are staggered in between the gussets in an opposing length of the double wall when viewed along a horizontal plane.

7. The reclosable package for an article of claim 1, further comprising:
a plurality of indentations along at least one sidewall of the cover; and
a plurality of equal and opposite indentations along at least one wall of the wall in the sidewalls of the base; and wherein
the indentations of the cover nest with the equal and opposing indentations of the base when the cover is in the closed position.

8. The reclosable package of claim 1, wherein the cover and the base each have a sidewall overlapping one another, when the cover is in the closed position, overlying the base with a plurality of package closures each comprised of the hook formed in the sidewall of one of the cover and base that engages part of the sidewall of the other one of the cover and base when the cover is in the closed position.

9. A reclosable package comprised of a pair of package halves joined by a hinge with one of the package halves comprising a cover, the other one of the package halves comprising an article-retaining base having an article-retaining cavity formed therein, and a package closure arrangement formed in the cover and base comprised of a plurality of spaced apart package hook snaps that releasably keeps the package closed when engaged, each one of the hook snaps comprising a snap hook formed in the one of the cover and base, the snap hook of each one of the hook snaps having a generally outwardly extending hook arm with an upturned hook lip that engages the other one of the cover and base when the cover is closed.

10. The reclosable package of claim 9 wherein each hook snap further comprises a snap hook receiver formed in the other one of the cover and base that receives the hook arm of the snap hook and engages with the upturned hook lip when the cover is closed.

11. The reclosable package of claim 9 wherein:
(a) the hook arm of each snap hook is cantilevered outwardly from the one of the cover and base having the upturned hook lip at the free end thereof; and (b) the snap hook of each hook snap engages an edge of the other one of the cover and base with the edge of the other one of the cover and base engaged thereby disposed between the upturned hook lip of the engaging snap hook and the one of the cover and base when the hook snap is releasably engaged therewith.

12. The reclosable package of claim 11 wherein the edge of the snap hook receiver is formed of a trimmed edge of the other one of the cover and base.

13. The reclosable package of claim 11 wherein the hook arm is generally triangular.

14. The reclosable package of claim 9 wherein each snap hook has a generally U-shaped cross-section.

15. The reclosable package of claim 9 wherein the hook arm is generally triangular with the hook lip disposed at a vertex of the generally triangular hook arm.

16. The reclosable package of claim 9 wherein the hook snap further comprises a snap hook receiver formed in the other one of the cover and base that is comprised of a cutout in a side edge or bottom edge of the other one of the cover and base.

17. The reclosable package of claim 16 wherein the snap hook formed in the one of the cover and base engages an edge of the other one of the cover and base formed by the cutout when the hook snap is releasably engaged.

18. The reclosable package of claim 17 wherein the edge of the other one of the cover and base formed by the cutout overlies the hook arm with part of the one of the cover and base disposed on one side of the edge and the hook lip disposed on the other side of the edge when the hook snap is releasably engaged.

19. The reclosable package of claim 9 further comprising a generally U-shaped or V-shaped elongate rib formed in one of the cover and base comprised of a pair of spaced apart rib sidewalls extending from a rib endwall having a plurality of rib constrictions spaced longitudinally along the rib formed of sections of the rib sidewalls and rib endwall pinched together with plastic deformation.

20. A reclosable package comprised of a pair of package halves joined by a hinge with one of the package halves comprising a cover, the other one of the package halves comprising an article-retaining base having an article-retaining cavity formed therein, and a package closure arrangement formed in the cover and base comprised of a plurality of spaced apart package closures that releasably keeps the package closed when engaged, wherein the cover and the base each have a sidewall overlapping one another when the cover is closed overlying the base with each one of the plurality of package closures comprised of a hook formed in the sidewall of one of the cover and base that engages part of the sidewall of the other one of the cover and base when the cover is closed, and wherein the sidewall of the other one of the cover and base is comprised of a rib having a pair of spaced apart rib sidewalls extending outwardly from a rib endwall.

21. The reclosable package of claim 20 wherein:
(a) the hinge is elongate and extends along one side of the reclosable package and the overlapping sidewalls of the base and cover extend along an opposite side of the reclosable package; and
(b) each hook extends generally toward the hinge when engaged with part of the sidewall of the other one of the cover and base when the package is closed.

22. The reclosable package of claim 21 wherein each one of the hooks is formed in the cover.

23. The reclosable package of claim 20 wherein the sidewall of the other one of the cover and base is comprised of a flange.

24. The reclosable package of claim 23 wherein the flange terminates in an edge and wherein the hook engages the edge of the flange when the cover is closed.

* * * * *